(12) United States Patent
Khachaturov (10) Patent No.: US 11,817,802 B2
(45) Date of Patent: Nov. 14, 2023

(54) VECTOR CONTROL METHOD AND SYSTEM OF A PERMANENT MAGNET MOTOR OPERATION

(71) Applicant: Dmytro Khachaturov, Kharkov (UA)

(72) Inventor: Dmytro Khachaturov, Kharkov (UA)

( * ) Notice: Subject to any disclaimer, the term of this patent is extended or adjusted under 35 U.S.C. 154(b) by 163 days.

(21) Appl. No.: 17/363,389

(22) Filed: Jun. 30, 2021

(65) Prior Publication Data

US 2021/0408951 A1 Dec. 30, 2021

(30) Foreign Application Priority Data

Jun. 30, 2020 (UA) .............................. a 2020 03948

(51) Int. Cl.
 *H02P 21/09* (2016.01)
 *H02P 21/20* (2016.01)
 *H02P 21/22* (2016.01)

(52) U.S. Cl.
 CPC .............. *H02P 21/09* (2016.02); *H02P 21/20* (2016.02); *H02P 21/22* (2016.02)

(58) Field of Classification Search
 CPC ........... H02P 21/09; H02P 21/20; H02P 21/22
 USPC ....................................................... 318/808
 See application file for complete search history.

(56) References Cited

U.S. PATENT DOCUMENTS

| 9,595,896 B1* | 3/2017 | Royak ........................ H02P 6/08 |
| 2007/0121354 A1* | 5/2007 | Jones ........................ H02J 3/381 |
| | | 363/67 |

OTHER PUBLICATIONS

CN 111193284 A (A Proportion Of Lifting Small Capacity Energy Storage Photovoltaic Virtual Synchronous Stability Of System Con Dong, He-nan Date Filed Aug. 19, 2019 (Year: 2020).*
WO 2018102872 A1 (Sensorless AC Motor Controlle) Hunter Gregory Peter Date Filed Dec. 7, 2017 (Year: 2018).*
Hunter (WO 2018102872 A1) (Year: 2018).*
Dong (CN 111193284 A) (Year: 2020).*

* cited by examiner

*Primary Examiner* — Jorge L Carrasquillo (57) ABSTRACT

A vector control method and system of a permanent magnet motor (PMM) comprising a step of counting parameters of components of a power cable line (channel) (PCL), between the PMM and a regulated voltage source (RVS), wherein counting at least parameters of an inductance, a resistance and a capacitance of elements of the PCL. Providing voltage sag compensation mode by controlling the RVS DC-link voltage parameter using a voltage sag control unit, and controlling the PMM frequency parameter by changing current and/or voltage PMM parameters counting changes in the RVS DC-link voltage parameter and a nominal power parameter of the PMM.

5 Claims, 6 Drawing Sheets

VECTOR CONTROL METHOD AND SYSTEM OF A PERMANENT MAGNET MOTOR OPERATION

CROSS-REFERENCES TO RELATED APPLICATIONS

The present patent application claims priority to Ukrainian patent application a202003948 filed Jun. 30, 2020.

FIELD OF INVENTION

The claimed invention relates to a field of electrical engineering, in particular to a vector control method of electric permanent magnets motors (PMM) utilized in electric submersible pump units in an oil industry and other sectors of industry.

BACKGROUND

Currently, an implementation of a variable frequency drive (VFD) in an energy and industry sectors aimed to solving problems of energy efficiency.

High efficiency of using PMM with regulated parameters by a regulated voltage source (RVS) allows to optimize the operation of various technological process with using mechanisms, such as pumps and fans units operated in variable modes, is confirmed by many years of world experience.

An efficiency of the oil industry, water supply, heating, cities and country areas could be significantly increased due to providing automation and implementation of variable frequency drives (VFD) with vector control PMMs.

In this case, providing of vector control for PMM of a submersible electric pump units can have some difficulties related to errors caused by presence of a long cable line of more than 2000 in, as well as the complexity VFD control system settings for a certain type of electric motor with permanent magnets. The claimed invention is aimed at solving said difficulties (problems) of the prior art.

Various methods and systems of the PMM vector control are known. For example, Russian Federation patent, No. RU 2132110 "Method of the vector control of the PMM". According to the patent the method comprising powering a stator winding with alternating current. Controlling an amplitude and phase angle which is regulated relative to a linked flux vector of a rotor. Wherein phase current is equal to the difference between an in-phase and ortho-phase currents. Wherein the in-phase and ortho-phase currents synchronously changed with the frequency of synchronization. Wherein a given torque changing depending on the difference between a set and current speed, and measuring currents in three phases of a stator.

Also, the U.S. Pat. No. 7,299,708B2 teaching a method of determining a rotor angle in a drive control for a motor, comprising the steps of determining a rotor magnetic flux in the motor; estimating the rotor angle on the basis of the rotor magnetic flux; and correcting the estimated rotor angle on the basis of reactive power input to the motor. Step determining a rotor angle may include the step of non-ideal integration of stator voltage and current values.

Step of estimating the rotor angle may include the step of correcting phase errors caused by said non-ideal integration via a PLL circuit with phase compensation. Step of correcting the estimated rotor angle may include the steps of calculating a first reactive power input value and a second reactive power input value as; determining a difference between said first and second reactive power input values; and applying said difference to the rotor angle to obtain a corrected rotor angle.

According to the prior art the estimating rotor angle step comprising a step of phase angle synchronizations with a phase error compensation.

Determining the rotor magnetic flux from the stator voltage (direct voltage or control voltage), taking into account current, resistance and inductance.

Problems involved in the prior art which are solved by the present invention comprising possibilities of tuning at the motor running, as well as taking into account characteristics of an intermediate elements of the communication line, with its own inductance, capacitance and resistance.

Also, the problem solved by the invention is aimed to create a system and method of a vector control of an electric permanent magnets motors (PMM) with high control accuracy, adaptive control and tuning system for a wide range of the PMM.

BRIEF SUMMARY OF THE INVENTION

The essence of the invention is aimed in minimizing electricity losses by using vector control (VSC) of the PMM, caused by increasing of an accuracy of regulation and expansion numerous of types of controlled electric motors (PMM).

In order to achieve the technical result, a vector control system of a permanent magnet motor (PMM) operation comprising regulated voltage source (RVS) with a control and a measuring system based on a control device and measuring components such output current sensors of the RVS and additional submersible measuring (telemetry) system of the PMM. Wherein said control device designed in a data connection with components of the measuring system. Components of the measuring system also comprising at least sensors of the PMM parameters, a power connection line (PCL) parameters and RVS parameters. The power connection line comprising at least a power cable, transformer and sine filter.

According to the present invention the control device comprising data processing units based on central processor (CP). The data processing units aims to operate data of the PMM rotor angle, torque and frequency parameters, as well as an estimated rotor angle correction unit, an equivalent motor circuit unit, an inductance, a resistance and a capacitance measuring unit and a voltage sag control unit. The voltage sag control unit designed to change current and/or voltage motor parameters depends on changes in a DC-link voltage parameter of the RVS.

Based on described variant of the PMM operation system the vector control method comprising a step of counting parameters of components of the PCL between the PMM and the RVS, wherein counting at least parameters of an inductance, a resistance and a capacitance of elements of the PCL. Next step goes to leading parameters of the PCL to values on the transformer winding on a side of the PMM, and referring parameters of the PCL to equivalent parameters of a stator winding of the PMM. Based on, at least, PCL parameters, providing a starting torque of the PMM and controlling the frequency parameter for transition from scalar control to a vector control mode. In the vector control mode providing voltage sag compensation mode by controlling DC-link voltage parameter using a voltage sag control unit, and controlling the PMM frequency parameter by changing current and/or voltage PMM parameters counting changes in a DC-link voltage parameter of the RVS and nominal power of the PMM.

The present invention as described in FIGS. 1 to 8 is related to a permanent magnet motor (PMM) control system and method that is implemented as a hardware-software complex. Wherein, the scope of the invention includes implementations in any combination of hardware, firmware and software that would have been within the ordinary level of skill in the art.

Figure 1:
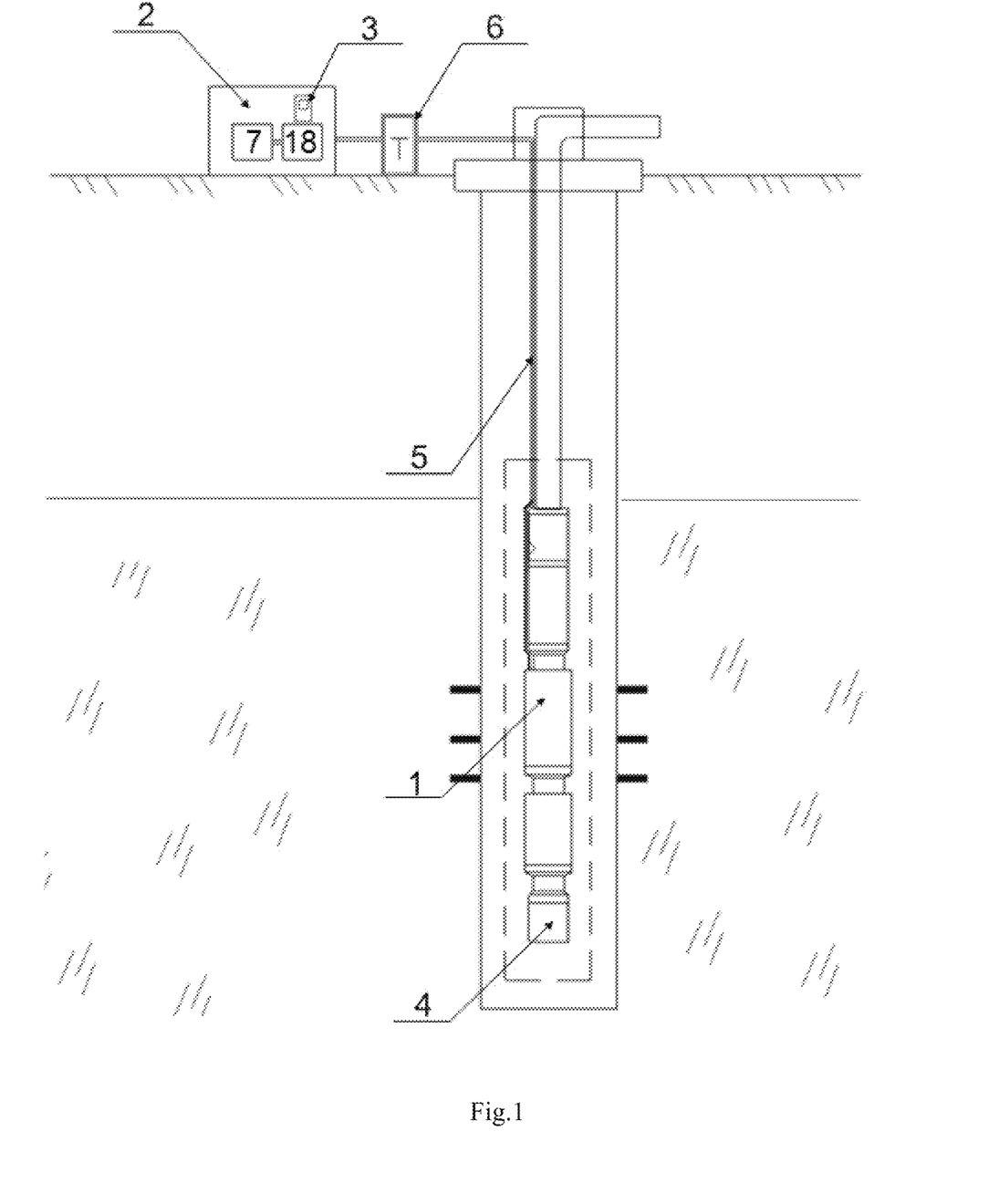
FIG. 1 is a schematic diagram showing a control system of a submersible PMM.

A schematic diagram of a submersible pump unit and a control system of a submersible PMM 1 showing in FIG. 1. The control system consists of a regulated voltage source (RVS) 2 which is formed as variable speed drive (VSD) with an automatic control system. Said control system is based on a control device 3 which is formed as a programmable processing control unit or another known type of electronic computer allowable to use in control systems.

The control system comprising measuring system components. Wherein components of the measuring system comprising at least sensors of the PMM parameters, a power connection line (PCL) parameters and RVS parameters. The components of the measuring system provide data collecting with parameters such as: the PMM resistance, a phase input and output voltage, resistance, inductance and capacitance of the PCL, parameters of a turbine rotation (Fturb.) of the PMM which is based on a data of submersible measuring (telemetry) unit 4.

The control device 3 is formed in data connection with the measuring system components for operating the PMM parameters, the PCL parameters and the RVS parameters. Wherein the PCL comprising at least an inductance, a resistance and a capacitance parameter related to components of the PCL, which comprising at least a power cable 5, a transformer 6 and a sine filter 7. Also, the PCL can contain another known electronic component with their own inductance, capacitance and resistance parameter.

Figure 2:
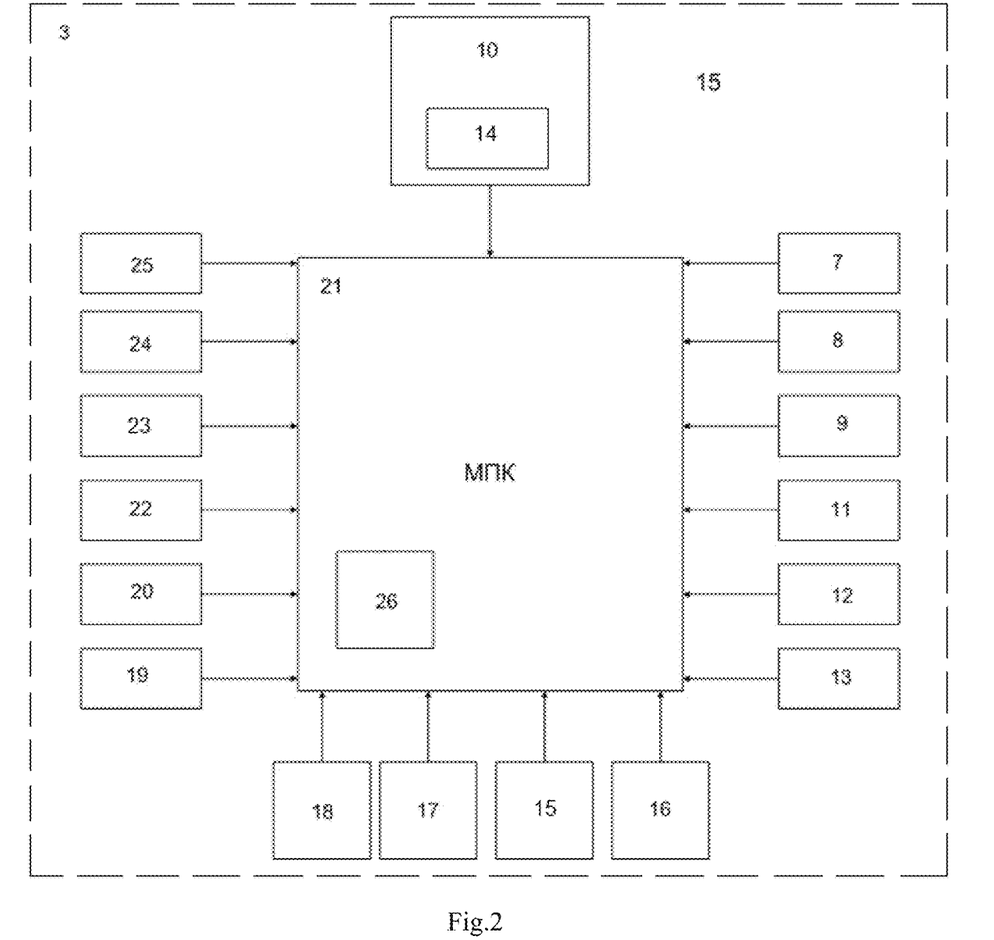
FIG. 2 is a schematic block diagram showing a control device.

The control device 3 showing in FIG. 2, comprising data processing units of the PMM rotor angle 8, torque and frequency 9 parameters, as well as an estimated rotor angle correction unit 10, an equivalent motor circuit unit 11, an inductance, a resistance and a capacitance operation unit 12 and a voltage sag control unit 13. The estimated rotor angle correction unit 10 contains an Automatic Frequency Control (AFC) unit 14. The present control system also comprising units 15; 16 of a Clarke-Park transformations, pulse-winds signal modulation (PWM) unit 17 for controlling inverter module 18 of the RVS 2. Also, a number of other auxiliary units can be implemented additionally into the control system of the RVS, used for the generally accepted system and method of the PMM vector control which are known from the prior art.

In order to solve the problem of the prior art, such as, insufficient accuracy of vector control of the PMM associated with the presence in the power communication line (channel) between the PMM and RVS some intermediate components, such as: long cable line 5, transformer 6 and sine filter 7. According to the present invention the PMM control system forming voltage signals which follows for the PMM rotor position, counting parameters of intermediate components of the PCL by using operation unit 12.

The expansion of the operational capabilities of the PMM vector control system is achieved by implementation of a functions of real time processing parameters of the PMM and PCL, which include units of collecting 18, regulating 19 and visualization 20 parameters of the vector control system. The implementation of the described functions of the system is possible on the basis of the control device hardware-software system based central processor (CP) 21. The visualization PMM parameters unit 20 is formed in data connection with the control device display 22.

A list of parameters which could be placed on the control device display 22 comprising PMM active and reactive current, PMM rotor angle, torque, frequency and inductance parameters, a DC-link voltage parameter and other. The list of parameters is changing depends on operating conditions and features of the technological process.

The control device 3 can be represented in a form of remote-control device connected to the RVS through a wired interface 23 (RS485/232) and a wireless interface 24 (GPRS, WIFI).

Figure 7:
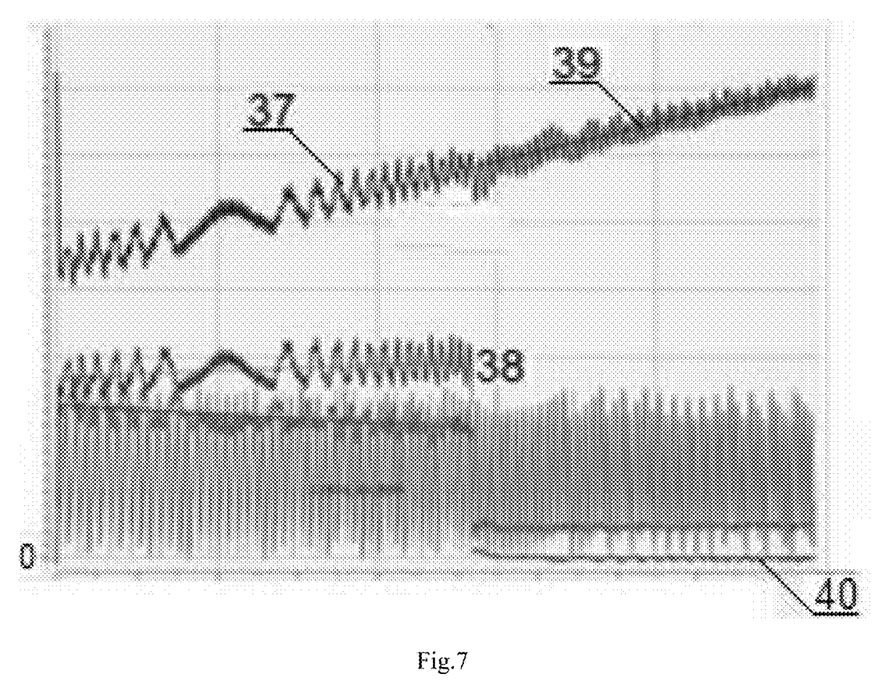
FIG. 7 is a diagram showing smoothing of transient processes of the PMM speed.

The function of real time processing parameters is based on periodic current monitoring which is measured by sensors 25 installed on the output of the sine filter 7 of the RVS 2. Each current measuring provides at least once per each PWM cycle. Measured current parameters are comparing with setting values. Compared value are showing in diagrams on the display 22 (FIG. 7-9). An updating frequency of diagrams is set by user and connected to the PWM cycle (period). A high signal transmission rate is provided by optimization of a circuit of electronic components of the control device.

For example, the CP 21 contains unit 26 of alignment data according to the phase of DC-link voltage taking into account a delay in transmission of control signals, through the PCL. Wherein the delay period is equal to at least one PWM cycle. Such function allows setting control signals with predicting possible values of parameters of the vector control system.

According to common practice known from the prior art, a motor vector control method is based on controlling frequency and output voltage by using RVS. A variant of the RVS control system is showing in FIG. 3. During starting a vector control mode (VCM) at a first step providing settings of transition voltage frequency 27 between a scalar control mode (SCM) and the VCM. On the next step 28 determine parameters of the rotor angle and frequency. Correcting 29 estimated rotor angle before the step 28 by using the Automatic Frequency Control (AFC) unit 14. Providing coordinate systems transformation (Park-Clark transformation) 30 and forming voltage control signals 31 as pulse width modulation (PWM) signals for the inverter module 18 of the RVS 2.

Figure 3:
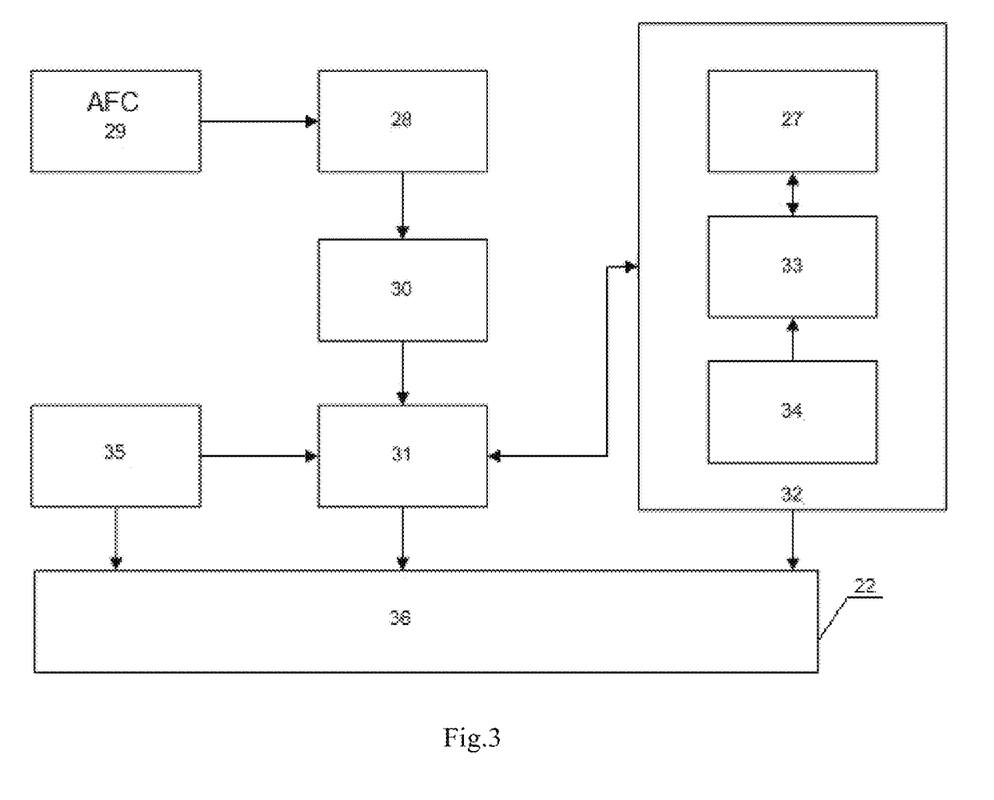
FIG. 3 is a schematic block diagram showing a regulated voltage source control system.

A tuning 32 of the vector control systems, also comprising step 33 of determination parameters of equivalent PMM circuits by the unit 11 of the control device.

According to the VCM tuning steps 27; 33 providing regulation of vector control system parameters, such as changing transition voltage frequency 27 according to settings via changing the PMM stator current value taking into account the PCL parameters which are adding on a step 34.

On the step 33 of determination parameters of equivalent PMM circuits, counting voltage control signals formed on the step 31. Wherein signals formed on the step 31 are based on parameters of an inductances along the rotor axes and the PMM rotor inertia (Mi). Signals formed on the step 31 allows to control active and reactive current of the RVS and a speed parameter of the PMM (as shown on FIG. 5). The control signals 31 used by the controlled voltage source, whereby the regulation of active and reactive current is realized, and also the speed of the electric motor is changing (see FIG. 5). Tuning 32 allows to setting main parameters of the PMM vector control system and improving of its accuracy.

On the step 31 forming voltage control signals which follows for the PMM rotor position and counting parameters of components of the PCL integrated between the PMM and the RVS. Wherein on the step 34 determining parameters of an inductance (C), a resistance (R) and a capacitance (L) of the PCL integrated components. The PCL integrated components comprising at least the power cable 5, the transformer 6 and the sine filter 7. On the step 31 of forming voltage control signals, the capacitance values can be canceled.

Mentioned parameters of PCL, are leading to values on the transformer winding on a side of the PMM which were determined on the step 27 or set manually by the operator (user). After that, on the step 34, values of parameters on the transformer winding are referring to equivalent parameters of a stator winding of the PMM. Described variant of the vector control system implementation is counted influences of PCL integrated components.

Also, according to a goal of improving accuracy and rate of a control signal transmission providing a step 35 of an alignment of voltage signals by the unit 26 according to the DC-link phase voltage, taking into account the delay in transmission of control signals, through the PCL. Wherein the delay period is equal to at least one PWM cycle.

Providing changes, control and visualization a set of parameters on a step 36 using the control device 3.

The set of parameters comprising at least the active and reactive current values, the inductance of the rotor axels, the rotor flux linkage, the PMM torque at the moment of transition from the scalar control mode to the vector control mode with the setting frequency (as shown in FIG. 4-8).

A variant of the PMM vector control implementation and tuning parameters is shown in FIG. 4-8.

Figure 4:
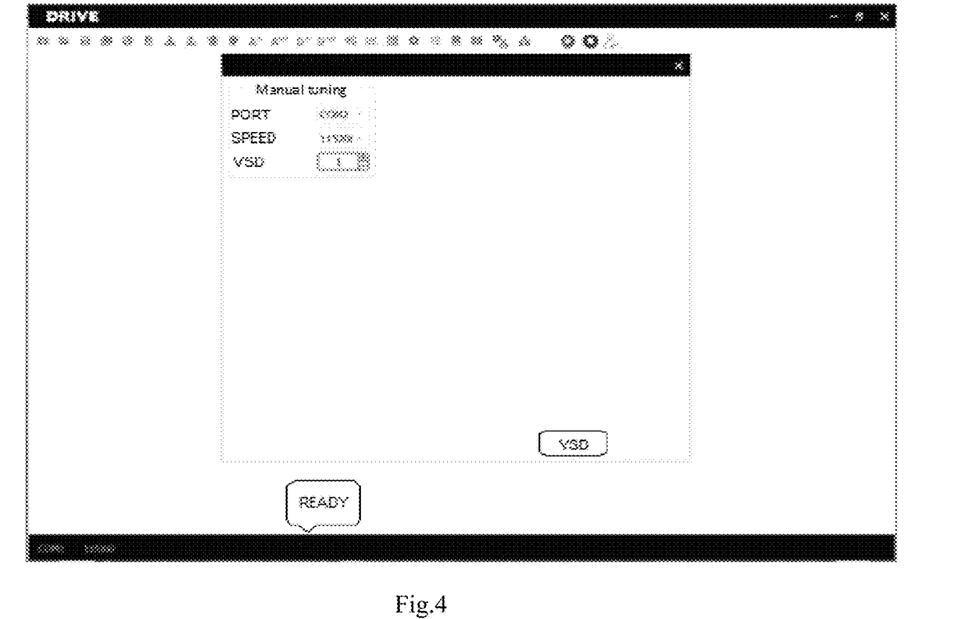
FIG. 4 is a graphical interface of a control device.

In FIG. 4 is shown a variant of a directory of the control device interface for managing RVS types and methods of connections (wired interface (RS485/232) and a wireless interface (GPRS, WIFI)). Also, present director allows to control RVS operating modes "READY", "WORK", "FAILURE" and other.

Figure 5:
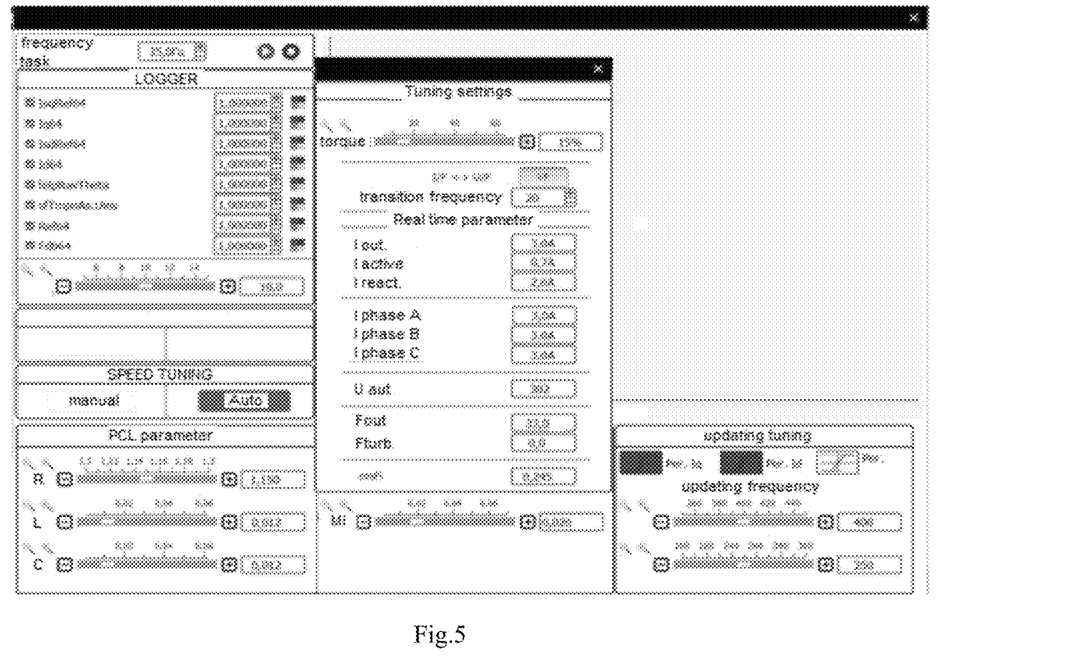
FIG. 5 is a variant of the control device interface directory showing parameters of the PMM control system.

In FIG. 5 shown a variant of a directory with the set of main parameters of the PMM vector control system. A listed parameter setting by the operator during the tuning mode with using additional directory (not shown on Drawings).

Figure 6:
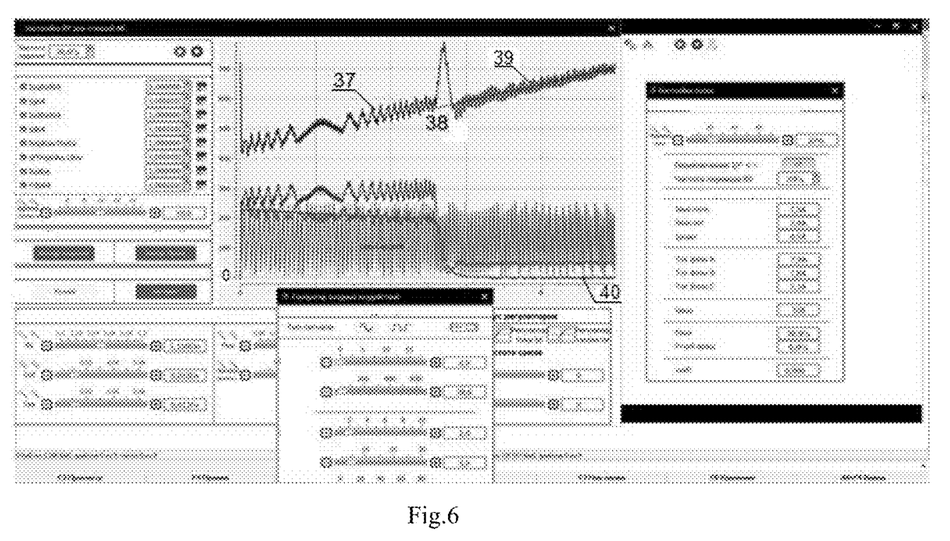
FIG. 6 is a variant of the control device interface showing the system operation and a diagram in real time with an explicit transient process.
Figure 8:
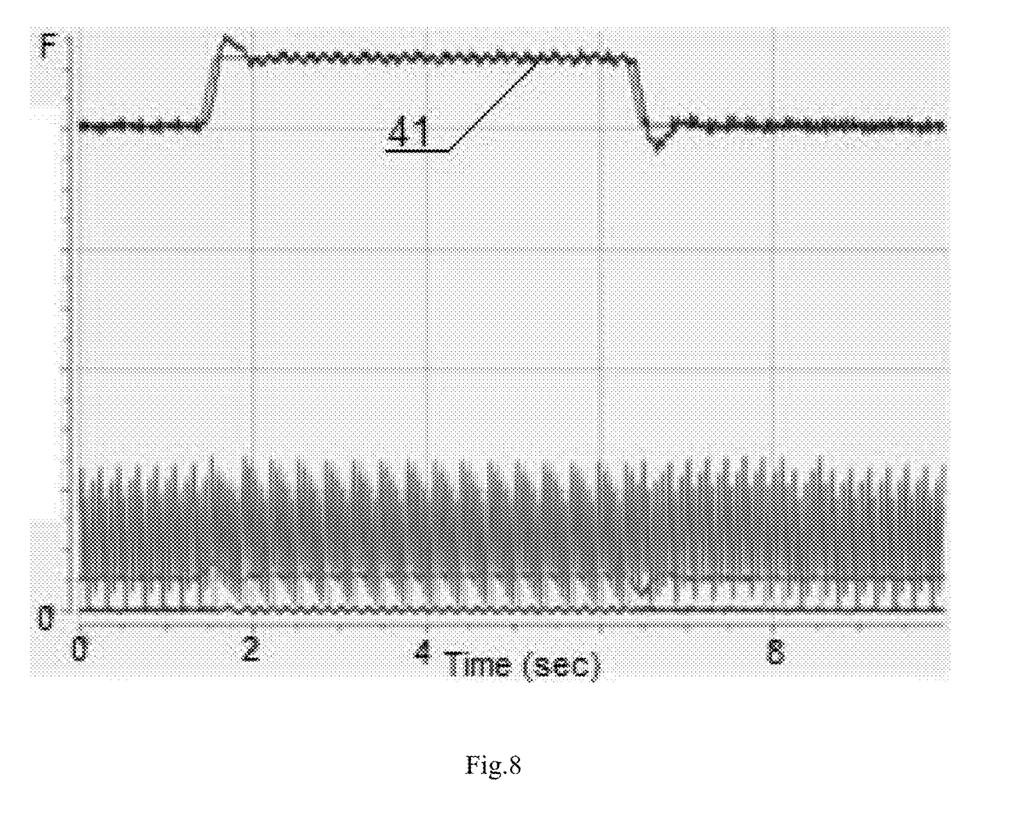
FIG. 8 is a diagram showing maintenance of the frequency and speed parameters of the PMM according to settings.

In FIGS. 6; 8 is shown a variant of a directory and a diagram of the control device interface for visualization the system parameters in the VCM in real time status. Said directory shows conditions 37 of the PMM speed till the moment of VCM activation. Also, it is showing a point 38 of transition between the scalar control mode and the vector control mode and a condition 39 of the vector control mode.

The present method of PMM vector control allows to smooth out the transition process at the point 38 via regulation of the stator current by influencing the current parameters in the rotor coordinates system, according to settings and counting parameters of PCL components Also, it is showing the reactive current values 40 equal to "0", which said about high efficiency the PMM vector control.

A speed (F) control condition 41 is showing in FIG. 8. In present control device screen directory, the PMM speed is changing according to the task. It is showing the real time status of the PMM speed parameter with its sags and stabilization with a timeline for completing PMM speed task.

The present VCM designed to providing a voltage sag compensation mode (VSCM) by controlling DC-link voltage parameter with using a voltage sag control unit 13. VSCM controlling the PMM frequency parameter by changing current and/or voltage the PMM by counting changes in the DC-link voltage parameter of the RVS and a nominal power characteristic of the PMM. Wherein the normal power characteristic of the PMM means a nominal power (i.e. optimum) values apply when the motor is running at more or less maximum efficiency. During a voltage sag accident, the DC-link voltage parameter is reducing.

Described variant of the VSCM comprising a step of changing the current value when the PMM nominal power characteristic is upper than real time needed power and, in this case, the PMM frequency is staying on normal rate. When the PMM nominal power characteristic is lower than real time needed power, the VSCM comprising a step of changing the current and the voltage value of the PMM by using the control device of the RVS. In that case the PMM frequency is becoming lower than normal rate.

The implementation of the claimed invention allows to solve a set of technical problems with providing high accuracy of the PMM vector control, which leads to improving energy efficiency by maintaining the value of the reactive current equal to "0" according to the task (FIG. 6, 7). Providing possibilities to maintain the frequency and speed values (FIG. 8) of the PMM according to the task. Described vector control method does not provide for the use PMM integrated sensors, based on that, could be implemented as sensorless vector control method.

The invention claimed is:
1. A vector control method of a permanent magnet motor (PMM) operation
   comprising: a regulated voltage source (RVS) with a control system and a measuring system based on a control device,
   wherein the control device is designed in a data connection with the measuring system components for measuring the permanent magnet motor parameters, a power connection line (PCL) parameters, and the regulated voltage source (RVS) parameters;
   wherein based on the PMM measured parameters, the PCL parameters and the RVS parameters:
   forming the permanent magnet motor vector control signals taking into account a rotor angle, a torque parameters and a frequency parameters,
   correcting an estimated rotor angle,
   providing a coordinate system Park-Clark transformation, forming a pulse width modulation (PWM) signals for the regulated voltage source, and forming parameters of an equivalent circuit of the permanent magnet motor;

wherein forming the PMM rotor position voltage follow signals taking into account the power connection line parameters between the permanent magnet motor and the regulated voltage source;

wherein providing an inductance parameters, a resistance parameters and a capacitance parameters of the power connection line elements, wherein the power connection line comprising at least a power cable, a transformer and a sine filter;

wherein leading the power connection line parameters to values on the transformer winding on the PMM side, and referring the power connection line parameters to the PMM stator equivalent parameters;

providing a phase alignment of a DC-link voltage parameter signal of the regulated voltage source, with a delay of at least one PWM cycle;

using current parameters in the rotor coordinate system and providing a starting torque of the PMM and controlling the frequency parameter for transition between a scalar control mode and a vector control mode;

providing a voltage sag compensation mode by controlling DC-link voltage parameter using a voltage sag control unit, and controlling the PMM frequency parameter by changing the PMM current parameters and/or voltage parameters, taking into account changes of the regulated voltage source DC-link voltage parameter and the PMM nominal power.

2. The vector control method of the permanent magnet motor (PMM) operation according to claim 1, wherein the control device comprising a hardware-software system that consists of a central processor (CP), the central processor comprising a real-time processing unit for collecting, regulating and visualization PMM parameters, wherein the central processor comprising the PMM parameter control units for controlling:
the PMM active and reactive current,
the PMM rotor angle value,
the PMM torque value,
the PMM frequency and inductance parameters,
wherein the PMM parameters visualization unit is designed in a data connection with the control device display.

3. The vector control method of the permanent magnet motor (PMM) operation according to claim 1, wherein the power connection line comprising at least elements with inductance constructive components.

4. The vector control method of the permanent magnet motor (PMM) operation according to claim 1, wherein in the voltage sag compensation mode, controlling the PMM frequency parameter by changing the current value when the PMM nominal power characteristic is upper than a real-time needed power,
wherein the PMM frequency is staying at a normal rate.

5. The vector control method of the permanent magnet motor (PMM) operation according to claim 1, wherein in the voltage sag compensation mode, controlling the PMM frequency parameter by changing the current value and the voltage value when the PMM nominal power characteristic is lower than the real-time needed power,
wherein the PMM frequency is becoming lower then the PMM frequency normal rate.

* * * * *